(12) United States Patent
Matsuzaki et al.

(10) Patent No.: US 9,194,475 B2
(45) Date of Patent: Nov. 24, 2015

(54) WORK VEHICLE

(75) Inventors: Yushi Matsuzaki, Sakai (JP); Atsushi Shinkai, Tondabayashi (JP); Atsushi Haramoto, Sakai (JP)

(73) Assignee: Kubota Corporation, Osaka (JP)

( * ) Notice: Subject to any disclaimer, the term of this patent is extended or adjusted under 35 U.S.C. 154(b) by 880 days.

(21) Appl. No.: 13/419,548

(22) Filed: Mar. 14, 2012

(65) Prior Publication Data

US 2012/0322615 A1 Dec. 20, 2012

(30) Foreign Application Priority Data

Jun. 17, 2011 (JP) .................................. 2011-135787
Jun. 17, 2011 (JP) .................................. 2011-135788

(51) Int. Cl.
| | |
|---|---|
| *F16H 61/02* | (2006.01) |
| *F16H 47/04* | (2006.01) |
| *F16H 61/06* | (2006.01) |
| *B60W 10/103* | (2012.01) |
| *B60W 10/184* | (2012.01) |
| *B60W 30/18* | (2012.01) |
| *B60W 30/186* | (2012.01) |

(52) U.S. Cl.
CPC .............. *F16H 47/04* (2013.01); *B60W 10/103* (2013.01); *B60W 10/184* (2013.01); *B60W 30/186* (2013.01); *B60W 30/18109* (2013.01); *F16H 61/0246* (2013.01); *F16H 61/061* (2013.01); *B60W 2540/10* (2013.01); *B60W 2540/103* (2013.01); *B60W 2540/12* (2013.01); *B60W 2710/1038* (2013.01); *B60W 2720/106* (2013.01); *Y10T 477/641* (2015.01); *Y10T 477/644* (2015.01); *Y10T 477/688* (2015.01)

(58) Field of Classification Search
None
See application file for complete search history.

(56) References Cited

U.S. PATENT DOCUMENTS

| 6,016,881 A * | 1/2000 | Sakai et al. ................... 180/204 |
|---|---|---|
| 2010/0184551 A1 | 7/2010 | Hiraoka et al. |

FOREIGN PATENT DOCUMENTS

| JP | 1106663 U | 7/1989 |
|---|---|---|
| JP | 200171794 A | 3/2001 |
| JP | 2002139125 A | 5/2002 |
| JP | 2003130215 A | 5/2003 |
| JP | 2003185006 A | 7/2003 |
| JP | 2006218978 A | 8/2006 |
| JP | 200974617 A | 4/2009 |
| JP | 2010111353 A | 5/2010 |
| JP | 2010234862 A | 10/2010 |
| JP | 201194703 A | 5/2011 |

* cited by examiner

*Primary Examiner* — Erin D Bishop
(74) *Attorney, Agent, or Firm* — The Webb Law Firm

(57) ABSTRACT

Controlling means of a work vehicle includes, as speed change output setting data indicative of relationship between operational positions of the operational pedal and outputs from a stepless speed change device, first data for setting a deceleration completion position of the operational pedal where the output from the stepless speed change device is zero to provide a larger operational amount of the operational pedal from a stepping release position and second data for setting the deceleration completion position to provide a smaller operational amount of the operational pedal from the stepping release position.

4 Claims, 8 Drawing Sheets

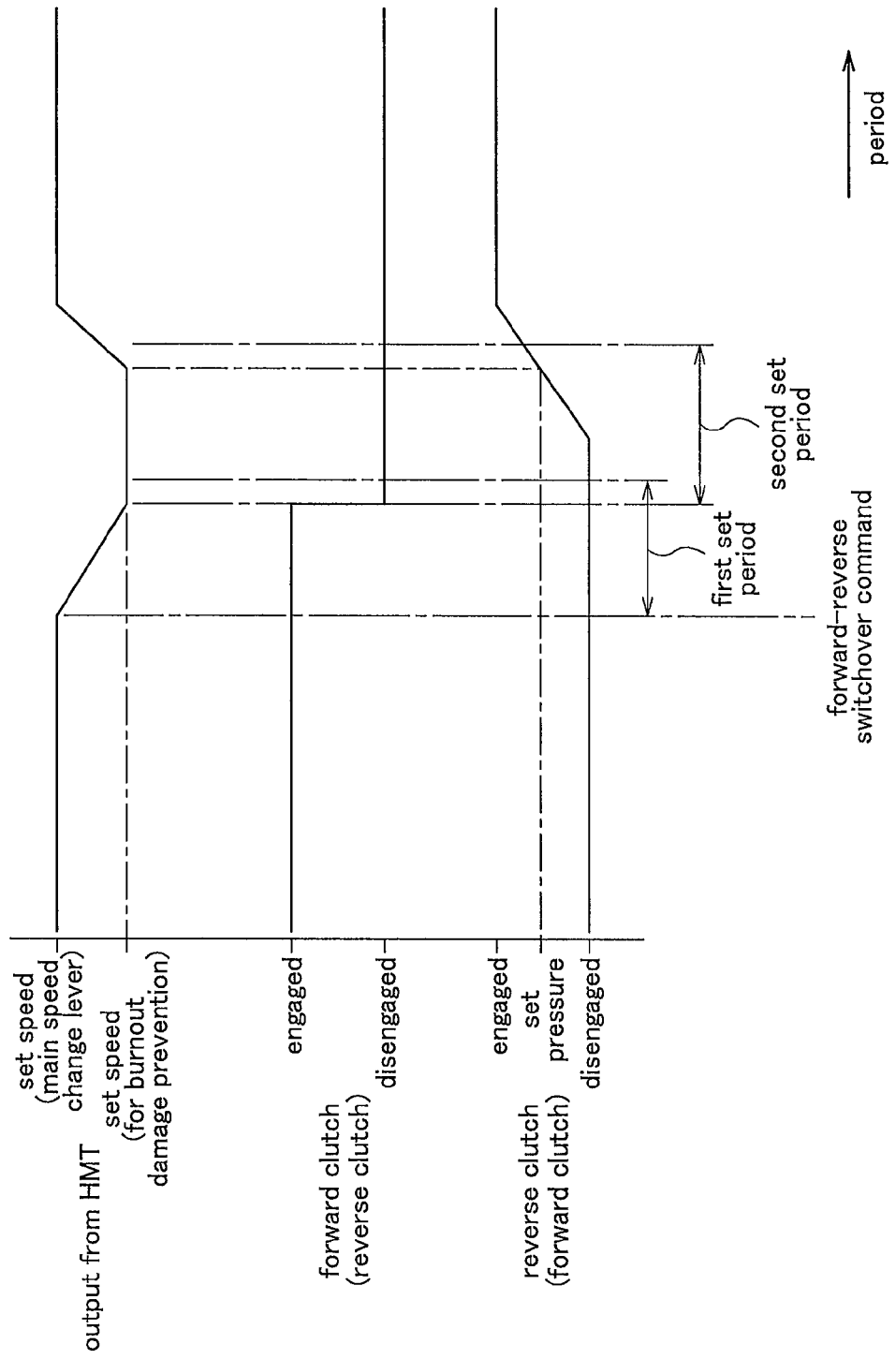

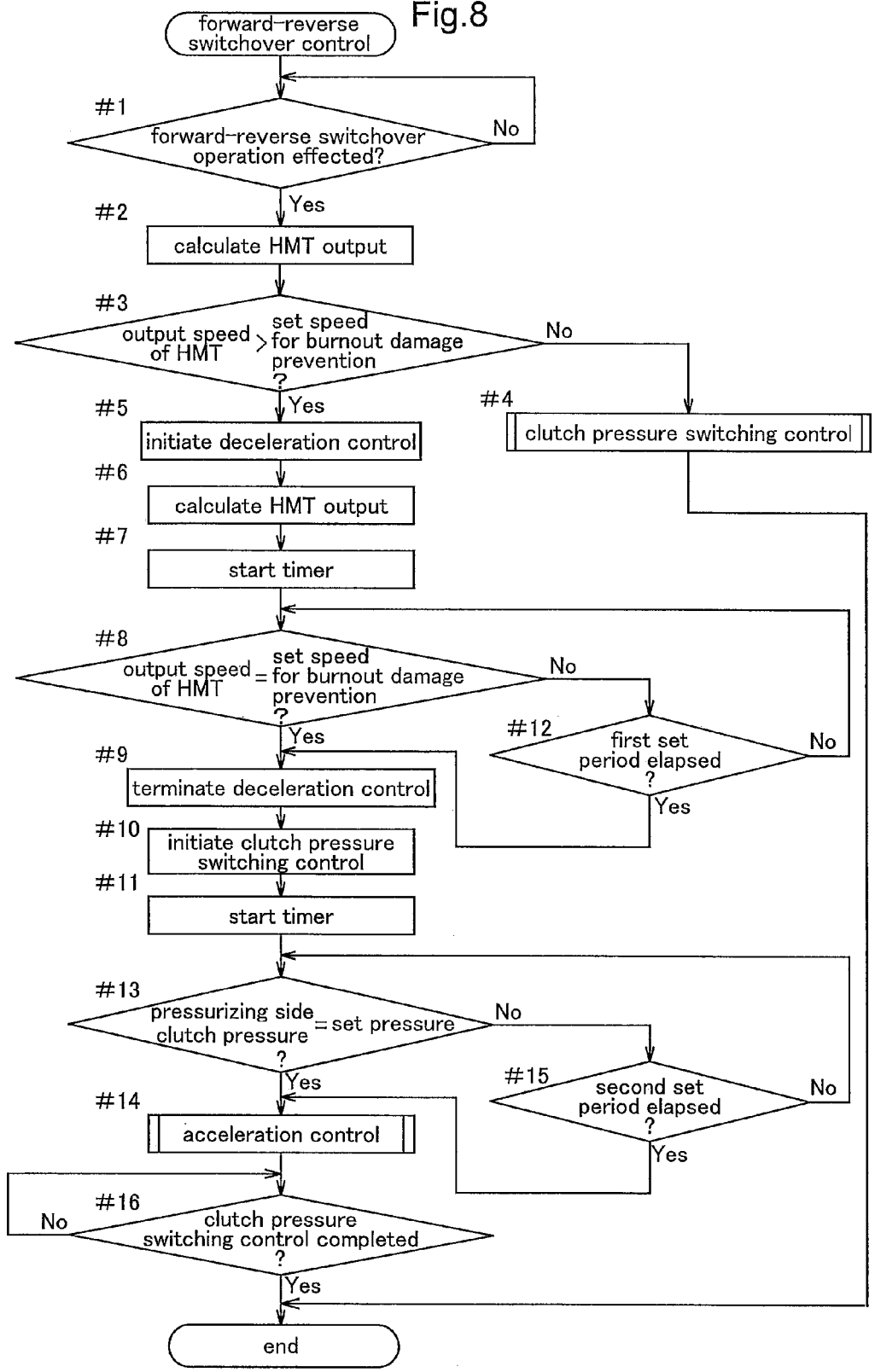

WORK VEHICLE

BACKGROUND OF THE INVENTION

1. Field of the Invention

The present invention relates to a work vehicle.

More particularly, the present invention relates to a vehicle speed control arrangement for a work vehicle, comprising:

speed change operating means for speed-changing a stepless speed change device to change an output from the stepless speed change device;

a brake device for braking a wheel with a braking force according to an operational position of an operational pedal which is automatically returned to a stepping release position;

a pedal sensor for detecting an operational position of the operational pedal; and controlling means for controlling an operation of the speed change operating means based on the output from the pedal sensor, thereby to change the output from the stepless speed change device to a speed according to the output from the pedal sensor in a speed change range between a set speed preset by a speed change operational tool and a zero speed.

Also, the present invention relates to a transmission switching arrangement for a work vehicle comprising:

transmission switching means having a plurality of hydraulic clutches for switching over a transmission state of a power transmission line including speed changing means;

controlling means for controlling operations of the transmission switching means and the speed changing means; and commanding means for commanding to the controlling means a switchover of the transmission state by the transmission switching means.

2. Description of the Related Art

[1] As a vehicle speed control arrangement of the above-described type, there is known one configured such that a vehicle body is braked and stopped in response to a movement of an operational pedal beyond a boundary position which is located between a speed change braking range and a stop braking range to reach the stop braking range; and that the vehicle body is started in response to a movement thereof beyond the boundary position back to the speed change braking range (see e.g. Japanese Unexamined Patent Application Publication No. 2010-111353 (JP 2010-111353 A)).

With the arrangement described in JP 2010-111353 A, in order to maintain the braked and stopped state of the vehicle body, it is required to keep the operational pedal in the stop braking range with a large stepping force. Therefore, if reduction occurs in the stepping force to the operational pedal when e.g. another operation is effected under the braked and stopped state, there is high possibility of the operational pedal being returned to the speed change braking range beyond the boundary position. With this, there was a risk that the vehicle body may be started inadvertently.

One object of the present invention is to prevent the possibility of inadvertent start of the vehicle body due to reduction in the stepping force to the operational pedal due to execution of another operation while the vehicle body is kept braked and stopped by a stepping operation on the operational pedal.

[2] As a transmission switching arrangement of the above-described type, there is one known configured such that a forward-reverse switching device is provided as the transmission switching means, and when the controlling means receives from the commanding means a forward-reverse switching command by the forward-reverse switching device, the controlling means controls pressures of a pair of hydraulic clutches thereby to effect a forward-reverse switchover (see e.g. Japanese Unexamined Patent Application Publication No. 2009-074617 (JP 2009-074617 A).

With the arrangement described in JP 2009-074617 A, during a high speed traveling, when the operational state of the forward/reverse switching device is switched over based on an output from the commanding means for commanding a forward-reverse switchover by the forward-reverse switching device, the amount of energy absorbed by the hydraulic clutch becomes excessive, so that there is the risk of burnout damage of the hydraulic clutches.

Thus, another object of the present invention is to restrict occurrence of burnout damage of the hydraulic clutches which may be caused by a switchover of a transmission state by the transmission switching means during a high speed traveling.

SUMMARY OF THE INVENTION

The above object described in [1] is fulfilled according to one aspect of the present invention as under:—

A vehicle speed control arrangement for a work vehicle, comprising:

speed change operating means for speed-changing a stepless speed change device to change an output from the stepless speed change device;

a brake device for braking a wheel with a braking force according to an operational position of an operational pedal which is automatically returned to a stepping release position;

a pedal sensor for detecting an operational position of the operational pedal; and controlling means for controlling an operation of the speed change operating means based on the output from the pedal sensor, thereby to change the output from the stepless speed change device to a speed according to the output from the pedal sensor in a speed change range between a set speed preset by a speed change operational tool and a zero speed;

wherein said controlling means includes, as speed change output setting data indicative of relationship between operational positions of the operational pedal and outputs from the stepless speed change device, first data for setting a deceleration completion position of the operational pedal where the output from the stepless speed change device is zero to provide a larger operational amount of the operational pedal from said stepping release position, and second data for setting said deceleration completion position to provide a smaller operational amount of the operational pedal from said stepping release position; and wherein upon detection, from the output from said pedal sensor during execution of a controlling operation based on said first data, that the operational position of the operational pedal is at a position on the side of a stepping limit position beyond said deceleration completion position, said controlling means is switched over from a state for executing the controlling operation based on said first data to a state for executing the controlling operation based on said second data.

With the above-described arrangement, during execution of a controlling operation based on the first data, if the operational pedal is operated to an operational position on the side of the stepping limit position beyond the deceleration completion position of the first data thereby to brake and stop the vehicle body, at the time of movement of the operational pedal beyond the deceleration completion position of the first data, the controlling means is switched from the state for executing the controlling operation based on the first data to a state for executing a controlling operation based on the second data. With this, the vehicle will not be started unless the operational pedal is returned to the deceleration completion position of the second data past the deceleration completion position of the first data.

Therefore, if reduction occurs in the stepping force to the operational pedal when another operation is effected under the braked and stopped state and the operational pedal is returned to a position between the deceleration completion position of the first data and the deceleration completion position of the second data, it is possible to prevent inadvertent start of the vehicle body.

Therefore, it is possible to prevent the possibility of inadvertent start of the vehicle body due to reduction in the stepping force to the operational pedal due to execution of another operation while the vehicle body is kept braked and stopped by a stepping operation on the operational pedal.

Preferably, in the above-described arrangement, acceleration completion positions of the operational pedal for changing the outputs from the stepless speed change device based on the first data and the second data to said set speed are set such that the acceleration completion position of the second data provides a smaller stepping operational amount from said stepping release position than the acceleration completion position of the first data.

With the above-described arrangement, with the first data, the output from the stepless speed change device is changed according to a stepping operation of the operational peal between the acceleration completion position (deceleration start position) to the deceleration completion position of the first data. Whereas, with the second data, the output from the stepless speed change device is changed between the acceleration completion position (deceleration start position) of the second data which is set to provide a smaller stepping operational amount from the stepping release position than the acceleration completion position of the first data, and the deceleration completion position of the second data which is set to provide a smaller stepping operational amount from the stepping release position than the deceleration completion position of the first data.

With the above-described arrangement, the change amount of the output from the stepless speed change device relative to the change amount of the operational position of the operational pedal based on the first data can be made similar or equal to the change amount of the output from the stepless speed change device relative to the change amount of the operational position of the operational pedal based on the second data.

Accordingly, the operational feel of the speed change operation by the operational pedal based on the first data can be made similar or equal to the operational feel of the speed change operation by the operational pedal based on the second data. As a result, the operability of speed change operations by the operational pedal can be improved.

Preferably, in the above-described arrangement, an operational range of the operational pedal, ranging from an operational position of the operational pedal located between said deceleration completion position of the first data and said deceleration completion position of the second data, to said stepping limit position, is set to a braking operational rage for operating said brake device.

With the above-described arrangement, with a speed change operation by the operational pedal based on the first data, the output from the stepless speed change device is changed according to a stepping position of the operational pedal in the speed change operational range. And, once the pedal reaches the braking operational range, the brake device is braked with speed reduction at the stepping operational position of the operational pedal. Therefore, the operability of speed change operations by the operational pedal can be improved and also the traveling stop operation of the vehicle body can be effected in a reliable manner with alleviation of the load applied to the brake device.

With the above-described arrangement, with a speed change operation by the operational pedal based on the second data, the output from the stepless speed change device is changed according to a stepping position of the operational pedal and the brake device is not braked in the speed change operational range. Hence, the operability of speed change operations by the operational pedal can be improved in the entirety of the speed change operational range of the operational pedal.

The above object described in [2] is fulfilled according to one aspect of the present invention as under:—

A transmission switching arrangement for a work vehicle comprising:

transmission switching means having a plurality of hydraulic clutches for switching over a transmission state of a power transmission line including speed changing means;

controlling means for controlling operations of the transmission switching means and the speed changing means;

commanding means for commanding, to the controlling means, switchover of the transmission state by the transmission switching means: and detecting means for detecting a rotational speed of the power transmission line;

wherein, upon receipt of a command from said commanding means for effecting the switchover of the transmission state by the transmission switching means, said controlling means compares an output from said detecting means with a set speed for transmission state switchover which is set in advance; and when the output from said detecting means is greater than said set speed, said controlling means causes reduction in the rotational speed of the power transmission line by a speed reducing operation of the speed changing means and then effects the transmission state switchover by controlling pressure of the plurality of hydraulic clutches.

With the above-described arrangement, it is possible to reduce the amount of energy absorbed by the hydraulic clutches in the course of transmission switchover by the transmission switching means. As a result, occurrence of burnout damage to the hydraulic clutches can be restricted.

Further, in comparison with e.g. the arrangement of reducing a rotational speed of the power transmission line by retaining the transmission switching means to the neutral position, the rotational speed of the power transmission line can be reduced more largely and speedily. As a result, the occurrence of burnout damage to the hydraulic clutches can be restricted even more effectively without deterioration in the operability of the transmission state switching operation.

Preferably, in the above-described arrangement, said speed changing means comprises a mechanical stepless speed change device.

With the above-described arrangement, in comparison with e.g. an arrangement wherein the rotational speed of the power transmission line is reduced by a brake device as an example of the speed changing means, the rotational speed of the power transmission line can be reduced more smoothly, whereby the operability of the transmission state switching operation can be improved.

Preferably, in the above-described arrangement, said controlling means is configured to reduce the rotational speed of the power transmission line to the set speed for the transmission state switchover by the speed reducing operation of the speed changing means; and then to effect the transmission state switchover by controlling pressure of the plurality of hydraulic clutches.

With the above-described arrangement, it is possible to reduce the amount of energy absorbed by the hydraulic clutches in the course of transmission state switchover by the transmission switching means to such a level as hardly causes any trouble in the hydraulic clutches. As a result, burnout damage of the hydraulic clutches can be prevented.

Preferably, in the above-described arrangement, said controlling means is configured to reduce the rotational speed of the power transmission line by effecting the speed reducing operation of the speed changing means for a set period; and then to effect the transmission state switchover by controlling pressure of the plurality of hydraulic clutches.

With the above-described arrangement, it is possible to prevent deterioration in the operability of the transmission state switching operation as reduction in the rotational speed of the power transmission line takes too long.

That is, it is possible to restrict occurrence of burnout damage to the hydraulic clutches while avoiding deterioration in the operability of the transmission state switching operation.

Preferably, in the above-described arrangement, said controlling means is configured to start the transmission state switchover by controlling pressure of the plurality of hydraulic clutches; and then to cause, by an acceleration operation of the speed changing means, to increase the rotational speed of the power transmission line to a speed prior to the speed reducing operation by the speed changing means.

With the above-described arrangement, it is possible to automatically increase the rotational speed of the power transmission line to a speed prior to deceleration by the speed changing means while effecting switchover of the transmission state by the controlling operation of the controlling means.

That is, occurrence of burnout damage to the hydraulic clutches can be restricted with achieving simplification of the operation.

Other aspects of the work vehicle, as well as advantageous effects of the same, will be apparent by reading the detailed description hereinafter with reference to the accompanying drawings.

BRIEF DESCRIPTION OF THE DRAWINGS

FIG. 7 is a timing chart showing relationship between outputs from the stepless speed change device and a forward clutch and a reverse clutch,
and
FIG. 8 is a flowchart of a forward-reverse switchover control.

DESCRIPTION OF THE PREFERRED EMBODIMENTS

One embodiment of the present invention will be described next with reference to the accompanying drawings, in which a tractor is illustrated as an example of a work vehicle.

Figure 1:
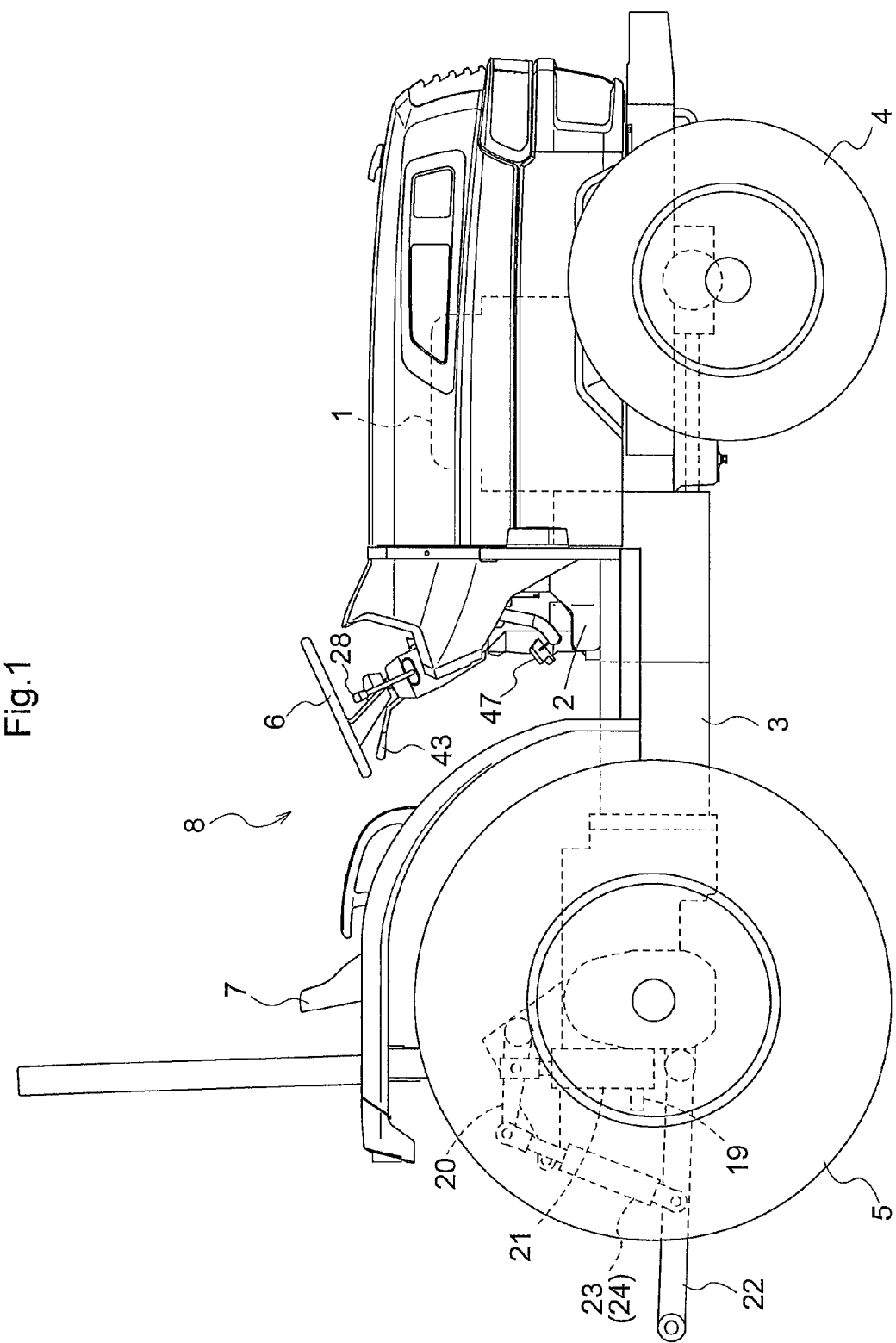
FIG. 1 is an overall side view of a tractor.
Figure 2:
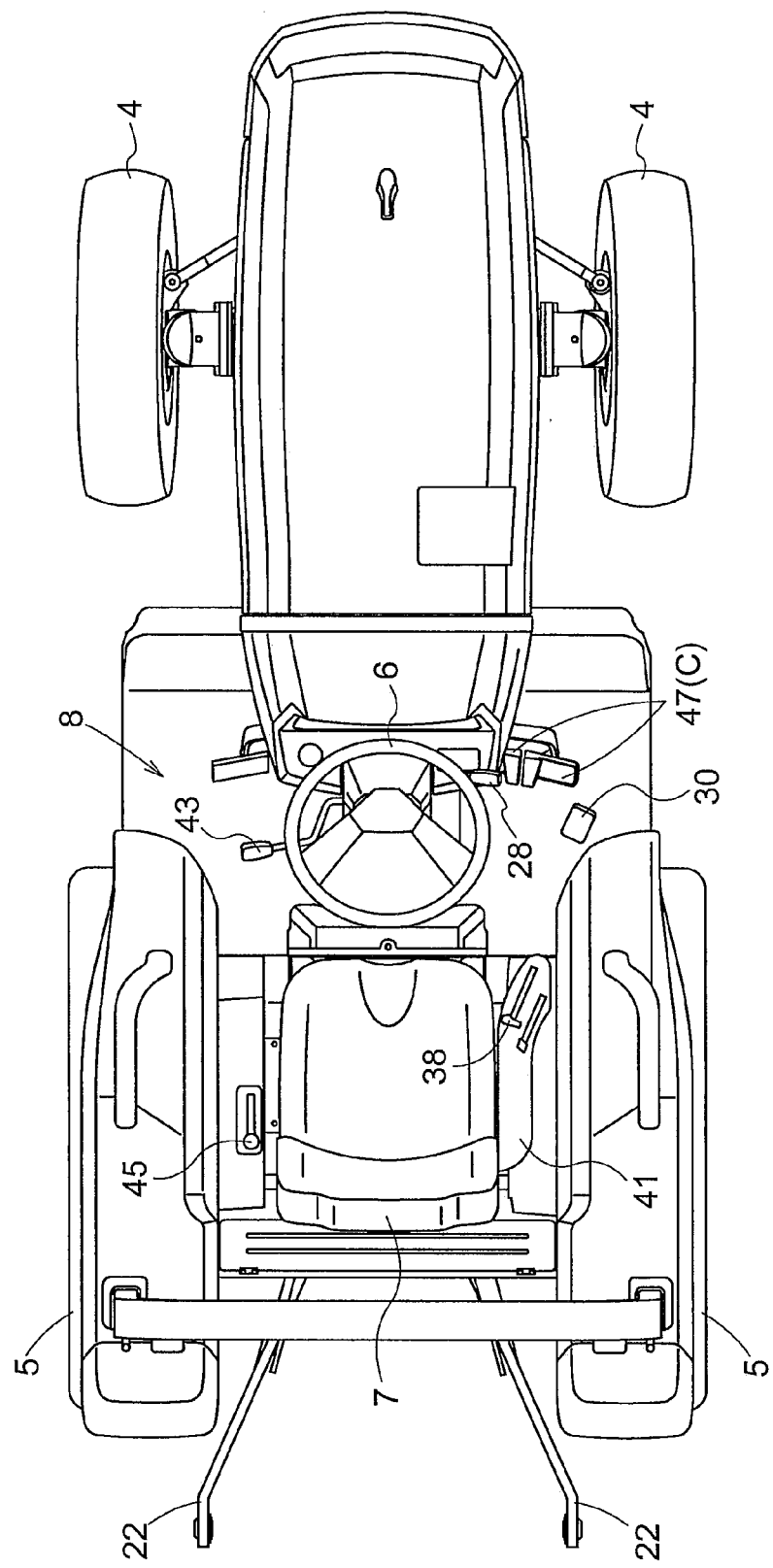
FIG. 2 is an overall plan view of the tractor.

As shown in FIG. 1 and FIG. 2, in this tractor, a clutch housing 2 is connected to a rear portion of an engine 1 mounted on a front portion of the tractor and to this clutch housing 2, there is connected a transmission case acting also as a frame ("a T/M case" hereinafter) which extends from the rear portion of the clutch housing 2 toward the rear portion of the vehicle body. On right and left sides of the engine 1, there are mounted a pair of right and left front wheels 4 which are steerable and drivable. On the right and left sides of the rear portion of the T/M case 3, there are mounted a pair of right and left rear wheels 5 which are drivable and can be braked. Upwardly of the T/M case 3, there are mounted a steering wheel 6 for steering the front wheels, a driver's seat 7, etc. together forming a boarding driving section 8.

Figure 3:
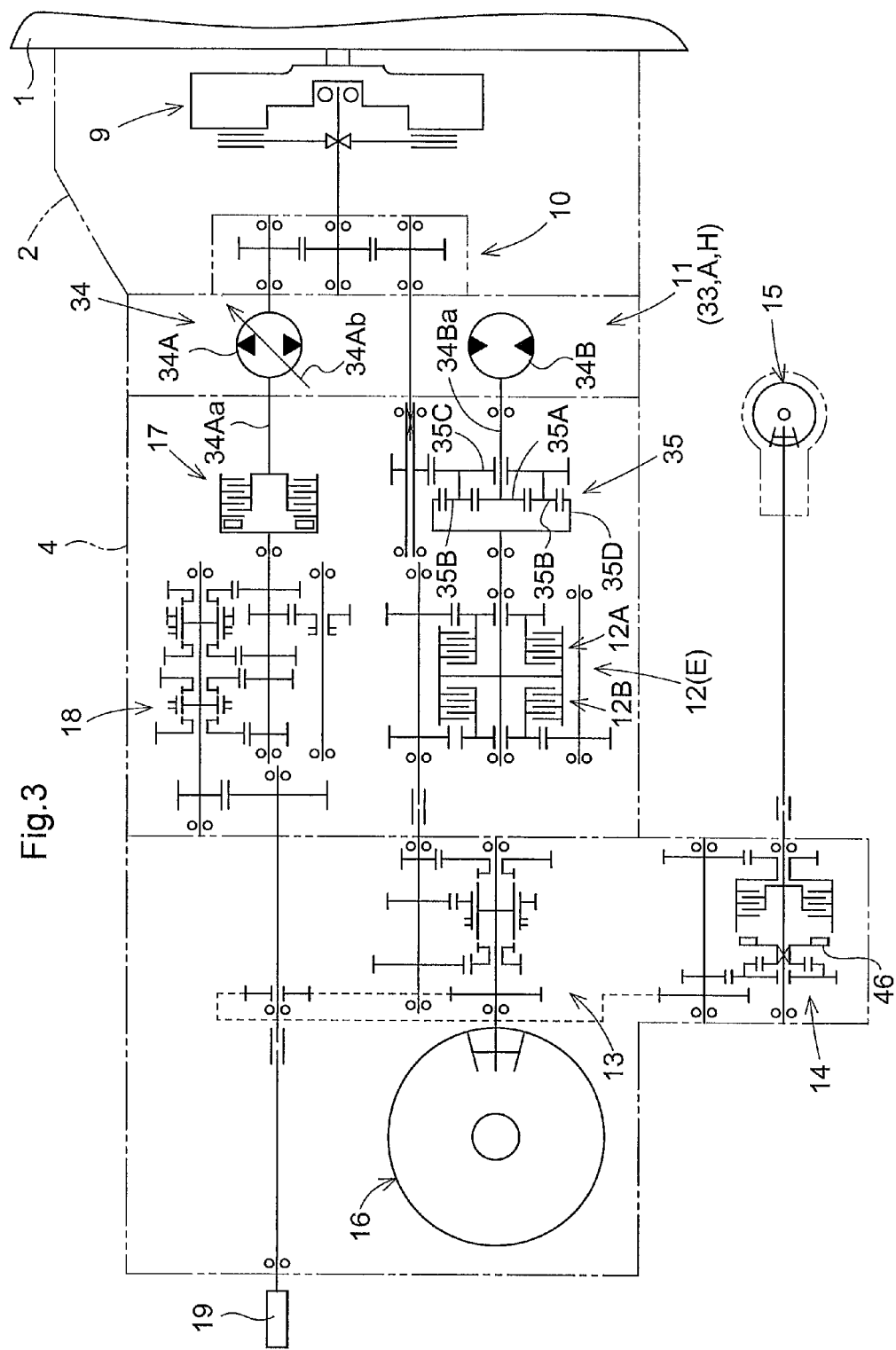
FIG. 3 is a side view in vertical section showing a transmission arrangement.

As shown in FIG. 3, power from the engine 1 is transmitted to a main speed change device 11 via a main clutch 9 and a gear type power distribution mechanism 10. And, a speed-changed power from the main speed change device 11 is transmitted as a traveling power to a synchromesh type auxiliary speed change device 13 via a forward-reverse switching device 12. Further, the speed-changed power from the auxiliary speed change device 13 is transmitted as a front wheel driving power to an electro hydraulic control type front wheel speed change device 14 and a front wheel differential device 15, etc and is transmitted also as a rear wheel driving power to the right and left rear wheels 5 via a rear wheel differential 16, etc. Further, power from the engine 1 past the main speed change device 11 (non speed changed power) is transmitted as working power to a power takeoff (PTO) shaft 19 via an electronic hydraulic control type PTO clutch 17, a synchromesh type PTO speed change device 18, etc.

As shown in FIG. 1 and FIG. 2, rearwardly of the T/M case 3, there are mounted a pair of right and left lift arms 20 which enable lifting up/down operations of a work implement (not shown) such as a rotary tiller or plow to be connected to the rear portion of this tractor; a pair of right and left lift cylinders 21 for pivotally driving the corresponding lift arms 20, and so on. The right lift arm 20 is coupled via a rolling cylinder 23 to a right lower link 22 which is vertically pivotally coupled to a right rear lower portion of the T/M case 3 for implement connection. The left lift arm 20 is coupled via a coupling rod 24 to a left lower link 22 which is vertically pivotally coupled to a left rear lower portion of the T/M case 3 for implement connection. As the right and left cylinders 21, single action type hydraulic cylinders are employed and as the rolling cylinder 23, a double-action type hydraulic cylinder is employed.

Namely, this tractor is capable of lifting up/down a work implement coupled to its rear portion by operations of the right and left lift cylinders 21 and capable also of a rolling action by an operation of the rolling cylinder 23. Further, in case a driven type work implement such as a rotary tiller or the like is connected to its rear portion, the tractor is capable of driving this work implement by the working power taken off the PTO shaft 19.

Figure 4:
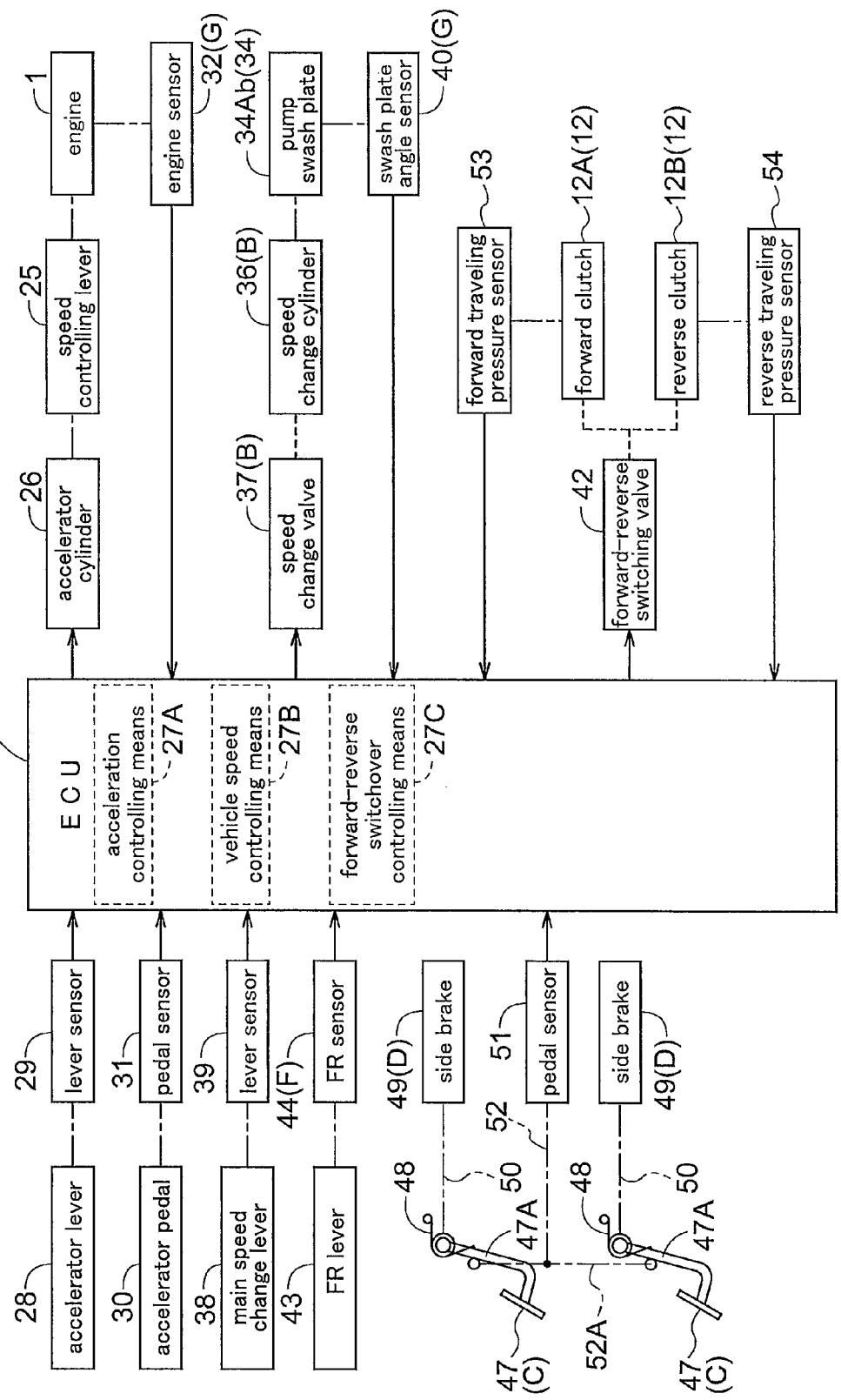
FIG. 4 is a block diagram showing a controlling arrangement.

As shown in FIG. 4, the engine 1 is steplessly adjustable in its output rotational speed between an idling rotational speed and a rated rotational speed by an operation of an acceleration cylinder 26 which operates a speed controlling lever 25 of its speed controller (not shown). As the acceleration cylinder 26, an electrically driven cylinder is employed. The operation of the acceleration cylinder 26 is controlled by acceleration controlling means 27A provided as a control program in an electronic control unit ("ECU" hereinafter) 27 which functions as controlling means.

The ECU 27 is constructed with using a microcomputer having a central processing unit (CPU), an electrically erasable programmable read-only memory (EEPROM), etc. The ECU 27 inputs an output from a lever sensor 29 for detecting an operational position of an accelerator lever 28, an output from an accelerator pedal 31 for detecting an operational position of an accelerator pedal 30, an output from an engine sensor 32 for detecting an output rotational speed of the engine 1, etc. Further, the ECU 27 stores therein a first engine rotational speed setting data indicative of relationship between operational positions of the accelerator lever 28 and the output rotational speeds of the engine 1, and a second engine rotational speed setting data indicative of relationship between operational positions of the accelerator pedal 30 and the output rotational speeds of the engine 1, etc.

As shown in FIG. 1, FIG. 2 and FIG. 4, the accelerator lever 28 is constructed as a fore-aft pivotal position retaining type and is mounted on the right lower side of the steering wheel 6. The accelerator pedal 30 is constructed as a self returning type which automatically returns to a stepping release position and is mounted at the right foot root portion of the boarding driving section 8. As the lever sensor 29 for the accelerator lever and the pedal sensor 31 for the accelerator pedal, rotary type potentiometers are employed. As the first engine rotational speed setting data and the second engine rotational speed setting data, map data, relational expressions or the like can be employed.

The acceleration controlling means 27A effects accelerator control, based on the output from the lever sensor 29 for the accelerator lever, the pedal sensor 31 for the accelerator pedal, the output from the engine sensor 32 and so on. More particularly, a set rotational speed corresponding to an operational position of the accelerator lever 28 and a set rotational speed corresponding to an operational position of the accelerator pedal 30 are obtained based on the output from the lever sensor 29 for the accelerator lever, the output from the pedal sensor 31 for the accelerator pedal, the first engine rotational speed setting data and the second engine rotational speed setting data; and these obtained rotational speed set by the accelerator lever 28 and rotational speed set by the accelerator pedal 30 are compared with each other. And, if the rotational speed set by the accelerator pedal 30 is smaller than or equals to the rotational speed set by the accelerator lever 28, the rotational speed set by the accelerator lever 28 is employed as the target rotational speed. Whereas, if the rotational speed set by the accelerator pedal 30 is greater than the rotational speed set by the accelerator lever 28, the rotational speed set by the accelerator pedal 30 is employed as the target rotational speed. And, the operation of the accelerator cylinder 26 is controlled such that the output from the engine sensor 32 may agree to the employed target rotational speed (may confine within the insensitive bandwidth of the target rotational speed).

As shown in FIG. 3, as the main speed change device 11, there is employed a hydromechanical type stepless speed change device ("HMT" hereinafter) 33 as an example of the stepless speed change device A. The HMT 33 comprises combination of a hydrostatic stepless speed change device ("HST" hereinafter) 34 and a planetary gear mechanism 35. The HST 34 includes an axial plunger type variable displacement pump 34A, an axial plunger type fixed displacement pump 34B, and so on. The planetary gear mechanism 35 includes a sun gear 35A mounted at the center thereof, three planetary gears 35B mounted in equidistantly spaced relationship around the sun gear 35A to mesh therewith, a planetary carrier 35C supporting the respective planetary gears 35B relatively rotatable with each other, an outer gear 35D surrounding these planetary gears 35B and so on. Power from the power distribution mechanism 10 is transmitted to a pump shaft 34Aa of the HST 34 and the planetary carrier 35C of the planetary gear mechanism 35. The HST 34 transmits the power after speed changing by this HST 34 from a motor shaft 34Ba to the sun gear 35A of the planetary gear mechanism 35. The planetary gear mechanism 35 combines and synthesizes the power from the engine 1 transmitted to the planetary carrier 35C and the power transmitted to the sun gear 35 after the speed changing by the HST 34 and transmits the resultant power to a forward-reverse switching device 12.

As shown in FIG. 3 and FIG. 4, the HST 34 is capable of speed-changing the power from the engine 1 by changing a swash plate angle of the variable displacement pump 34A. The swath plate angle of the variable displacement pump 34A can be changed in stepless manner by an operation of a speed change cylinder 36 mounted inside the T/M case 3. As this speed change cylinder 36, a double-action type hydraulic cylinder is employed. The operation of the speed change cylinder 36 is controlled by an operation of a speed change valve 37 which controls flow of oil to the speed change cylinder 36. As the speed change valve 37, an electromagnetic proportional valve is employed. The operation of the speed change valve 37 is controlled by a controlling operation of vehicle speed controlling means 27B provided as a control program in the ECU 27.

As shown in FIG. 2 and FIG. 4, the ECU 27 inputs the output from a lever sensor 39 for detecting the operational position of a main speed change valve lever 38 as a speed change operational tool, an output from a swash plate angle sensor 40 for detecting the swash plate angle of the variable displacement pump 34A, and so on. The ECU 27 further stores therein swash plate angle setting data indicative of relationship between operational positions of the main speed change valve lever 38 and the swash plate angles of the variable displacement pump 34A, and so on.

The main speed change lever 38 is constructed as a fore-aft pivotal position retaining type and is mounted on the front side of an armrest 41 mounted on the right side of the driver's seat 7. As the lever sensor 39 for the main speed change lever and the swash plate angle sensor 40, rotary type potentiometers are employed. As the swash plate angle setting data, map data, relational expressions or the like can be employed.

The vehicle speed controlling means 27B effects a main speed change control, based on the output from the lever sensor 39 for the main speed change lever, the output from the swash plate angle sensor 40, and the swash plate angle setting data. More particularly, a swash plate angle of the variable displacement pump 34A is set as the target swash plate angle, which angle corresponds to the operational position of the main speed change lever 38 which is obtained based on the operational position of the main speed change lever 38 outputted from the lever sensor 39 for the main speed change lever and also based on the swash plate angle setting data. Then, the operation of the speed change cylinder 36 is controlled by controlling the speed change valve 37 such that the swash plate angle of the variable displacement pump 34A may agree to this target swash plate angle (the swash plate angle of the variable displacement pump 34A may be confined within the insensitive bandwidth of the target swash plate angle).

Though not shown, the swash plate angle setting data are configured for setting the relationship between the operational positions of the main speed change lever 38 and the swash plate angles of the variable displacement pump 34A as follows. When the operational position of the main speed change lever 38 is at the zero speed position, the swash plate angle of the variable displacement pump 34A is set to the maximum angle in the reverse direction and the operational position of the pump swash plate 34Ab is set to the reverse highest speed position. Further, when the operational position of the min speed change lever 38 is at the highest speed position, the swash plate angle of the variable displacement pump 34a is set to the maximum angle in the forward direction and the operational position of the pump swash plate 34Ab is set to the forward highest speed position. In these ways, the operational amount of the pump swash plate 34Ab from the reverse highest speed position is changed in accordance with the operational amount of the main speed change lever 38 from the zero speed position.

The HMT 33 is configured as follows. Namely, when the swash plate angle of the variable displacement pump 34A is the maximum angle in the reverse direction (in the following discussion, this will be referred to as the minimum swash plate angle of the variable displacement pump 34A), the output after the synthesis by the planetary gear mechanism 35 becomes the zero speed. And, when the swash plate angle of the variable displacement pump 34A is the maximum angle in the forward direction (in the following discussion, this will be referred to as the maximum swash plate angle of the variable displacement pump 34A), the output after the synthesis by the planetary gear mechanism 35 becomes the highest speed. In these ways, the output is increased in accordance with the operational amount from the minimum swash plate angle (the reverse highest speed position of the pump swash plate 34Ab) of the variable displacement pump 34A.

That is, the speed change cylinder 36, the speed change valve 37, and so on together constitute speed change operating means B for varying the output from the HST 33 with an operation of the pump swash plate 34Ab of the variable displacement pump 34A.

Incidentally, the swash plate angle setting data are set such that a proportional relationship may be established between the operational positions of the main speed change lever 38 and the outputs from the HMT 33.

As shown in FIGS. 1 through 4, the forward-reverse switching device 12 comprises a forward clutch 12A and a reverse clutch 12B employing multiple-plate hydraulic clutches, etc. And, by controlling operations of a forward-reverse switching valve 42 for controlling flow of oil to/from the forward clutch 12A and the reverse clutch 12B, there can be selectively provided a forward transmission state wherein the power from the HMT 33 is transmitted as a forward traveling power to the auxiliary speed change device 13, a reverse transmission state wherein the power from the HMT 33 is transmitted as a reverse traveling power to the auxiliary speed change device 13, and a transmission blocked state wherein the power transmission from the HMT 33 to the auxiliary speed change device 13 is blocked. As the forward-reverse switching valve 42, an electromagnetic control valve is employed. The operation of the forward-reverse switching valve 42 is controlled by a controlling operation of forward-reverse switchover controlling means 27C provided as a control program in the ECU 27.

As shown in FIG. 2 and FIG. 4, the ECU 27 inputs e.g. an output from a forward/reverse (FR) sensor 44 for detecting an operational position of an FR lever 43 for forward-reverse switchover. The FR lever 43 is provided as a forward-reverse pivotal type capable of retaining the position selectively at two positions of a forward position and a reverse position and is mounted on the left lower side of the steering wheel 6. The FR switch 44 includes a forward position detecting micro switch which is switched to its closed state in response to an operation of the FR lever 44 to the forward traveling position, and a reverse position detecting micro switch which is switched to its closed state in response to an operation of the FR lever 44 to the reverse traveling position.

The forward-reverse switchover controlling means 27C effects forward-reverse switchover control for switching over the operational state of the forward-reverse switching device 12, based on the output from the FR sensor 44. In this forward-reverse switchover control, basically, upon detection of switchover of the FR lever 43 from the forward position to the reverse position based on the output from the FR sensor 44, the forward clutch 12A is depressurized to be switched to the blocking state, and upon lapse of a set period thereafter, the reverse clutch 12B is pressurized to be switched to its transmission state, such that the forward-reverse switching device 12 is switched to the reverse transmission state by controlling the operation of the forward-reverse switching valve 42. Upon detection of switchover of the FR lever 43 from the reverse position to the forward position based on the output from the FR sensor 44, the reverse clutch 12B is depressurized to be switched to the blocking state, and upon lapse of a set period thereafter, the forward clutch 12A is pressurized to be switched to its transmission state, such that the forward-reverse switching device 12 switched to the forward transmission state by controlling the operation of the forward-reverse switching valve 42.

As shown in FIG. 2, in the boarding driving section 8 and on the left side portion of the driver's seat 7, there is mounted an auxiliary speed change lever 45. Though not shown, the auxiliary speed change device 13 is operably coupled to this auxiliary speed change lever 45 via a mechanical type auxiliary speed change coupling mechanism such that the speed position of the auxiliary speed change device 13 is switched to a low speed for working, a high speed for working or to a highest speed for traveling in accordance with the operational position of the auxiliary speed change lever 45.

As shown in FIG. 3, with a sliding operation of a shift member 46, the front wheel speed change device 14 is capable of selectively providing an equal speed transmission state wherein the power from the auxiliary speed change device 13 is transmitted to the right and left front wheels 4 such that the peripheral speed of the right and left front wheels 4 may synchronize with the peripheral speed of the right and left rear wheels 5, or an accelerated transmission state wherein the power from the auxiliary speed change device 13 is transmitted to the right and left front wheels 4 such that the peripheral speed of the right and left front wheels 4 may be approximately the double speed of the peripheral speed of the right and left rear wheels 5.

Though not shown, the shift member 46 slides the front wheel speed change device 14 to the equal speed transmission state or to the accelerated transmission state, with an operation of the front wheel speed change cylinder employing a double-action type hydraulic cylinder. The operation of this front wheel speed change cylinder can be controlled by controlling the operation of the front wheel speed change valve which controls the flow of oil to/from the front wheel speed change cylinder. As the front wheel speed change valve, an electromagnetic control valve is employed. The operation of the front wheel speed change valve is controlled by a controlling operation of front wheel speed change controlling means provided as a program in the ECU 27.

The ECU 27 inputs an output from a steering angle sensor detecting a steering angle of the front wheels 4, an output from a selector switch provided in the boarding driving section 8, etc. As the steering angle sensor, a rotary type potentiometer is employed.

The front wheel speed change controlling means is configured to be capable of effecting a front wheel speed change control for switching over the front wheel speed change device 14 between the equal speed transmission state and the accelerated transmission state according to the output from the steering angle sensor. And, in response to each output from an ON signal from the selector switch with a pressing operation of this selector switch, switchover is effected between a front wheel speed change selected state for effecting the front wheel speed change control, and a front wheel speed control release state for not effecting the front wheel speed change control.

In the front wheel speed change control, specifically, the operation of the front wheel speed change valve is controlled as follows. Namely, when it is detected that the steering angle of the front wheels 4 is smaller than a set angle (e.g. 35 degrees) based upon the output from the steering angle sensor, the front wheel speed change device 14 is rendered into the equal speed transmission state. Whereas, when it is detected that the steering angle of the front wheels 4 is greater than the set angle (e.g. 35 degrees) based upon the output from the steering angle sensor, the front wheel speed change device 14 is rendered into the accelerated transmission state.

With the above-described arrangement, when it is desired to reduce the steering radius of the vehicle body at the time of e.g. a furrow edge turn for steering the front wheels 4 by an angle greater than the set angle, the state will be set in advance to the front wheel speed change selected state by an operation of the selector switch. With this, in association with the steering of the front wheels 4 by the angle greater than the set angle, the front wheel speed change device 14 can be automatically switched from the equal speed transmission state to the accelerated transmission state, so that the vehicle can be turned with a turning radius which is smaller than the turning radius at the time of equal speed transmission state. And, by returning the steering angle of the front wheels 4 to an angle smaller than the set angle, the front wheel speed change device 14 can be automatically switched from the accelerated transmission state back to the equal speed transmission state.

As shown in FIG. 1, FIG. 2 and FIG. 4, at the right foot base portion of the boarding driving section 8, there are mounted a pair of right and left brake pedals 47 as operational pedals C. Each of the right and left brake pedals 47 is pivotally returned to a stepping release position by the action of a torsion spring 48 corresponding thereto. The left brake pedal 47 is operably coupled via a left mechanical brake coupling mechanism 50 to a left side brake 49 which brakes the left rear wheel 5. The right brake pedal 47 is operably coupled via a right mechanical brake coupling mechanism 50 to a right side brake 49 which brakes the right rear wheel 5. As the right and left side brakes, multiple-plate type brakes are employed.

Though not shown, the left brake coupling mechanism 50 operably couples the left brake pedal 47 and the left side brake 49 to each other via a crank arm, a push rod, etc, so that when the left brake pedal 47 is stepped on to a braking operational range, the left side brake 49 is caused to brake the left rear wheel 5 by a braking force corresponding to the amount of the stepping operation of the left brake pedal 47 in the braking operational range. Similarly, the right brake coupling mechanism 50 operably couples the right brake pedal 47 and the right side brake 49 to each other via a crank arm, a push rod, etc, so that when the right brake pedal 47 is stepped on to a braking operational range, the right side brake 49 is caused to brake the right rear wheel 5 by a braking force corresponding to the amount of the stepping operation of the right brake pedal 47 in the braking operational range.

With the above-described arrangement, by stepping on the left brake pedal 47 alone to the braking operational range, the left rear wheel 5 can be braked by the left side brake 49. Conversely, by stepping on the right brake pedal 47 alone to the braking operational range, the right rear wheel 5 can be braked by the right side brake 49. Further, by stepping on the right and left brake pedals 47 at the same time by a same operational amount to the respective braking operational ranges, the right and left rear wheels 5 can be braked at the same time with a same braking force by the right and left side brakes 49.

That is to say, at the time of a turning traveling with a pivoting operation of the steering wheel 6 to the steering direction, by stepping either one of the right and left brake pedals 47 alone which one pedal corresponds to the inner turning side rear wheel 5, the turning state can be switched from the turning state provided by the pivotal operation of the steering wheel 6 to the braking turning state for braking the turning inner side rear wheel, so that the turning radius of the vehicle body can be reduced. Further, by stepping on the right and left brake pedals 47 at the same time to the braking operational range, the right and left side brakes 49 can be used as a deceleration stopping brake device D.

Though not shown, the right and left brake pedals 47 are provided with a coupling mechanism capable of selectively providing a coupled state for inhibiting their independent operations and a coupling released state for allowing the independent operations. With this, the right and left brake pedals 47 can be switched between a state which allows switchover to the braking turning state by their independent operations and a state for inhibiting switchover to the braking turning state.

Further, the boarding driving section 8 is provided with a retaining mechanism capable of retaining the left brake pedal 47 stepped on to the braking operational range to this braking operational range. With this, after the right and left brake pedals 47 are stepped on to the braking operational range while these pedals are coupled to each other via the coupling mechanism, the retaining mechanism will be operated to retain the left brake pedal 47 to the braking operational range, whereby the right and left brake pedals 47 can be retained at the respective braking operational range at that time. As a result, the right and left side brakes 49 can be retained at the braking state wherein the right and left rear wheels 5 are braked by a braking force corresponding to the amount of the stepping operation on the right and left brake pedals 47. That is, by the retaining mechanism, the right and left side brakes 49 can be caused to function as a parking brake.

As shown in FIG. 4, to the right and left brake pedals 47, there is operably coupled a single pedal sensor 51 for detecting a simultaneous stepping position of the right and left brake pedals 47 which is the position of the operation of stepping on these brake pedals 47 at the same time, via a link mechanism 52 configured to transmit, to the pedal sensor 51, only the amount of simultaneous stepping operation from the stepping release position in case the right and left brake pedals 47 are stepped on at the same time.

As the pedal sensor 51, a rotary potentiometer is employed. And, this pedal sensor 51 detects the amount of the simultaneous stepping operation from the stepping release position of the right and left brake pedals 47, as the simultaneous stepping operational position of the right and left brake pedals 47.

The link mechanism 52 is configured to maintain, by the action of a torsion spring (not shown), a right-left oriented contact member 52A disposed upstream in the stepping direction of the right and left brake pedals 47 in contact with an arm portion 47A of either one brake pedal 47 from the upstream side in the stepping direction. With this arrangement, when the right and left brake pedals 47 are not stepped on simultaneously, the contact member 52A is received by the right and left brake pedals 47 positioned at the stepping release position, thus being positioned at its reference position which corresponds to the stepping release position. Whereas, when either one of the right and left brake pedals 47 is stepped on, the contact member 52A is received by the other brake pedal 47 which is positioned at the stepping release position, thus being positioned at the reference position. Only when the right and left brake pedals 47 are stepped on simultaneously, the contact member 52A follows to come into contact with the right and left brake pedals 47 with the action of the torsion spring. And, the following movement amount of the contact portion 52A from the reference position is transmitted to the pedal sensor 51 as a simultaneous stepping operational amount from the stepping release position of the right and left brake pedals 47.

Figure 5:
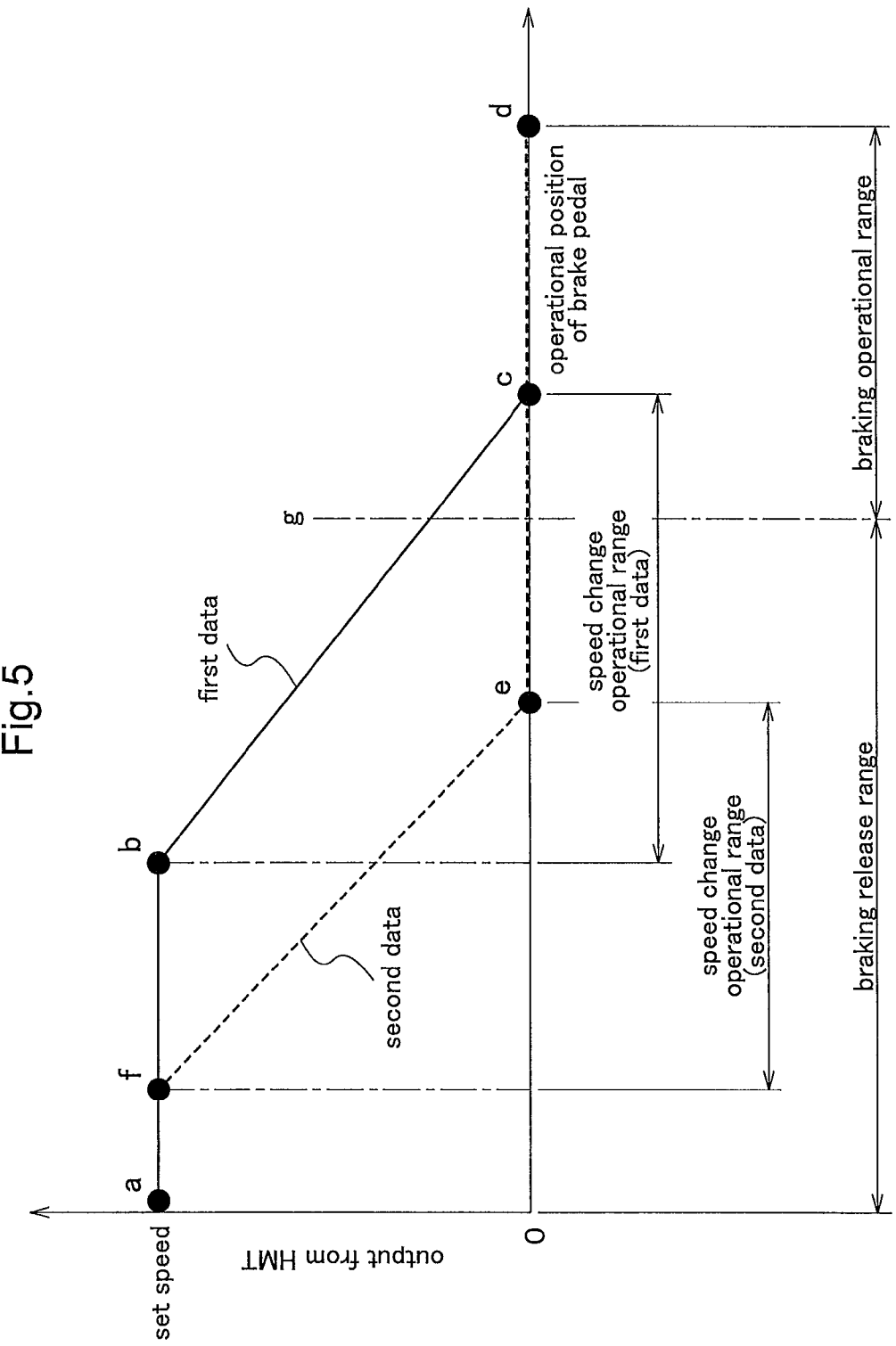
FIG. 5 is a view showing relationship between operational positions of a brake pedal and outputs from a stepless speed change device.

As shown in FIG. 4 and FIG. 5, the pedal sensor 51 outputs the detected simultaneous stepping operational position of the right and left brake pedals 47 to the ECU 27. The ECU 27 stores therein e.g. speed change output setting data indicative of relationship between the simultaneous stepping operational positions of the right and left brake pedals 47 and the outputs from the HMT 33. The speed change output setting data can be map data, relational expressions, or the like. Incidentally, this speed change output setting data serves for both forward traveling and reverse traveling. Instead, speed change output setting data for forward traveling and speed change output setting data for reverse traveling may be provided separately.

In the ECU 27, the vehicle speed controlling means 27B effects a pedal speed change control, based on a set swash plate angle of the variable displacement pump 34A set in correspondence with the operational position of the main speed change lever 38, the output from the swash plate angle sensor 40, the output from the pedal sensor 51 for the brake pedal and the speed change output setting data. More particularly, a set output (set speed) of the HMT 33 corresponding to the operational position of the main speed change lever 38 is obtained from a set swash plate angle of the variable displacement pump 34A set in correspondence with the operational position of the main speed change lever 38. Then, the speed change output setting data are corrected such that this set output may become the maximum output (maximum speed) corresponding to the stepping release position (a) of the right and left brake pedals 47 based on the speed change output setting data. And, based on the simultaneous stepping position of the right and left brake pedals 47 outputted from the pedal sensor 51 for the brake pedal and on the corrected speed change output setting data, the output from the HMT 33 (output speed) corresponding to the simultaneous stepping position of the right and left brake pedals 47 is obtained and the obtained output from the HMT 33 is set as a target output (target speed). Then, a target swash plate angle for the variable displacement pump 34A corresponding to a target output for obtaining this target output as the output from the HMT 33 is obtained and the speed change cylinder 36 is operated by controlling the operation of the speed change valve 37 so that the swash plate angle of the variable displacement pump 34A may agree to the obtained target swash plate angle (may confine within the insensitive band with of the target swash plate angle).

Figure 6:
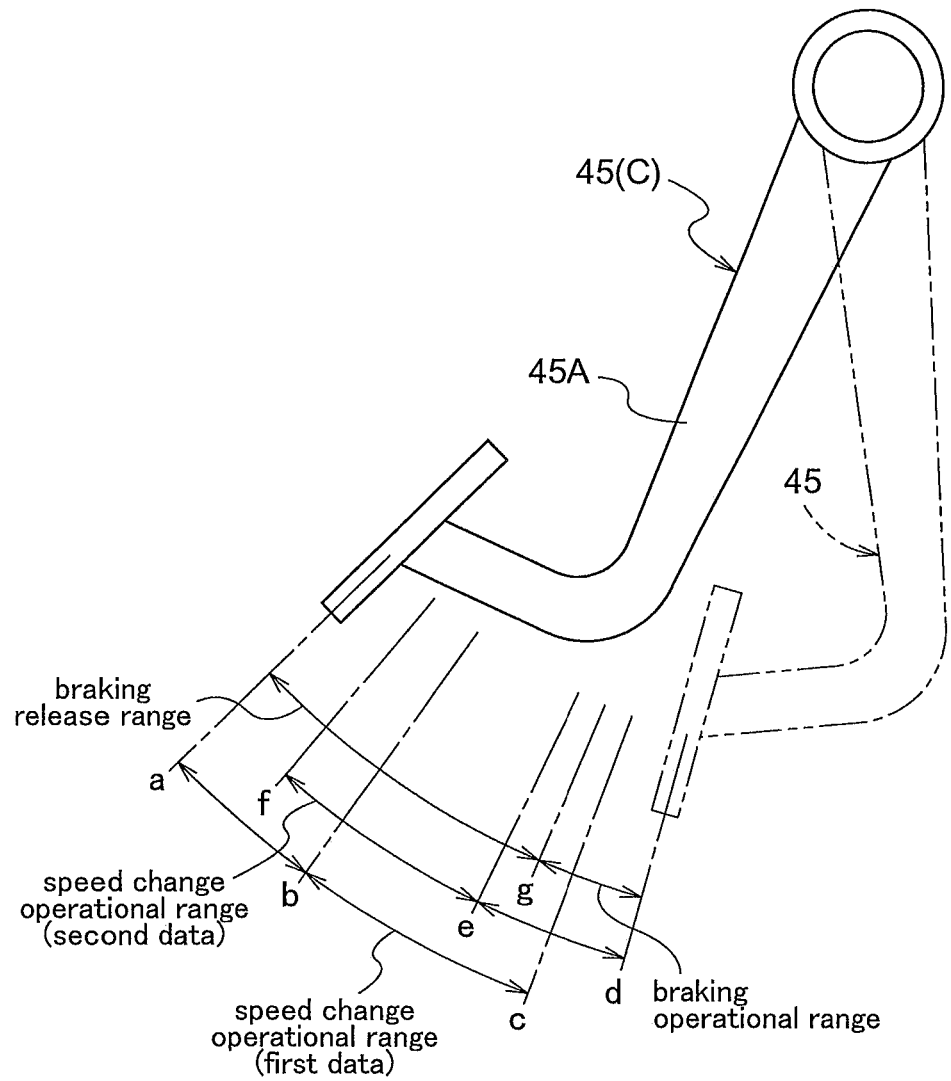
FIG. 6 is a side view showing operational positions of the brake pedal.

As shown in FIG. 5 and FIG. 6, the speed change output setting data includes first data and second data. The first data sets relationship between the simultaneous stepping operational positions of the right and left brake pedals 47 and the outputs from the HMT 33 as follows. Namely, during movement of the right and left brake pedals 47 from the stepping release position (a) to a preset deceleration start position (acceleration complete position) (b), the output from the HMT 33 is maintained at the maximum output (the set speed corresponding to an operational position of the main speed change valve lever 38). During the movement from the arrival at the deceleration start position (b) and then beyond a deceleration completion position (c), the output from the HMT 33 is changed between the maximum output and the minimum output (zero speed) in reverse proportion to the simultaneous stepping operational amount of the right and left brake pedals 47 (see the solid line in FIG. 5). The second data sets relationship between the simultaneous stepping operational positions of the right and left brake pedals 47 and the outputs from the HMT 33 as follows. Namely, during movement of the right and left brake pedals 47 from a stepping limit position (d) to a preset acceleration start position (deceleration completion position) (e), the output from the HMT 33 is maintained to the minimum speed. The, during the movement from the acceleration start position (e) back before a present acceleration completion position (f), the output from the HMT 33 is changed between the minimum output and the maximum output in reverse proportion to the simultaneous stepping operational amount of the right and left brake pedals 47 (see the broken line in FIG. 5).

The deceleration start position (b) is set at a operational position of a larger simultaneous stepping operational amount from the stepping release position of the right and left brake pedals 47 than the acceleration completion position (f). The acceleration start position (e) is set at an operational position of a smaller simultaneous stepping operational amount from the stepping release position (a) of the right and left brake pedals 47 than the deceleration completion position (c).

Further, the difference between one simultaneous stepping operational amount of the right and left brake pedals 47 from the stepping release position (a) to the deceleration start position (b) and the other simultaneous stepping operational amount from the stepping release position (a) to the acceleration completion position (f) is set smaller than the difference between one simultaneous stepping operational amount of the right and left brake pedals 47 from the stepping release position (a) to the deceleration completion position (c) and the other simultaneous stepping operational amount from the stepping release position (a) to the acceleration start position (e). Whereby, the change amount of the output from the HMT 33 corresponding to the simultaneous stepping operational amount of the right and left brake pedals 47 between the deceleration start position (b) and the deceleration completion position (c) of the first data may be smaller than the change amount of the output from the HMT 33 corresponding to the simultaneous stepping operational amount of the right and left brake pedals 47 between the acceleration start position (e) and the acceleration completion position (f) of the second data.

The vehicle speed controlling means 27B is configured to switch over the speed change output setting data from the first data to the second data for effecting a pedal speed change control based on the second data, when the simultaneous stepping operational position of the right and left brake pedals 47 moves beyond the deceleration completion position (c) during a pedal speed change control based on the first data. Further, the vehicle speed controlling means 27B is configured also to switch over the speed change output setting data from the second data to the first data for effecting a pedal speed change control based on the first data, when the simultaneous stepping operational position of the right and left brake pedals 47 moves back before the acceleration completion position (f) during a pedal speed change control based on the second data.

The operational range of the right and left brake pedals 47 includes a braking release range wherein the right and left side brakes 49 are maintained to the braking release state, despite a stepping operation of the right and left brake pedals 47; and a braking operational range wherein, the braking force applied by the right/left side brake 49 to the corresponding rear wheel 5 is increased in response to increase in the stepping operational amount of the right and left brake pedals 47, and the braking force applied by the right/left side brake 49 to the corresponding rear wheel 5 is decreased in response to decrease in the stepping operational amount of the right and left brake pedals 47. And, a boundary position (g) between the braking release range and the braking operational range is located between the deceleration completion position (c) and the acceleration start position (e), so that the deceleration completion position side range portion in the speed change operational range of the right and left brake pedals 47 of the first data is overlapped with the braking operational range and that the speed change operational range of the right and left brake pedals 47 of the second data is not overlapped with the braking operational range.

With the above-described arrangement, during a traveling condition where the main speed change valve lever 38 is operated to a desired operational position and the right and left brake pedals 47 are positioned at the stepping release position (a), if a simultaneous stepping operation of the right and left brake pedals 47 is effected, the vehicle speed controlling means 27B effects the pedal speed change control based on the first data, and the right and left side brakes 49 brake the right and left rear wheels 5 with a braking force corresponding to the simultaneous stepping operational amount in the braking operational range.

With the above, during the movement of the right and left brake pedals 47 from the stepping release position (a) to the deceleration start position (b), the vehicle speed controlling means 27B maintains the output from the HMT 33 to a set speed corresponding to the operational position of the main speed change valve lever 38 and also the right and left side brakes 49 do not brake the right and left rear wheels 5. Hence, despite a simultaneous stepping operation of the right and left brake pedals 47, the vehicle speed change can be fixed at the set speed obtained by the operational positions of the accelerator lever 28, the main speed change valve lever 38 and the auxiliary speed change valve lever 45.

Further, during the movement of the right and left brake pedals 47 from the deceleration start position (b) past the boundary position (g) between the braking release position and the braking operational position, the vehicle speed controlling means 27B changes the output from the HMT 33 according to the simultaneous stepping operational position of the right and left brake pedals 47 and the right and left side brakes 49 do not brake the rear wheels 5. Therefore, with a simultaneous stepping operation of the right and left brake pedals 47, the vehicle speed can be changed within a range between the set position and a speed obtained when the right and left brake pedals 47 are stepped on to the boundary position (g).

Moreover, during the further movement of the right and left brake pedals 47 from the boundary position (g) and past the deceleration completion position (c), the vehicle speed controlling means 27B changes the output from the HMT 33 according to the operational position of the right and left brake pedals 47 and also the right and left side brakes 49 brake the right and left rear wheels 5 with a braking force corresponding to the simultaneous stepping operational amount in the braking operational range of the right and left brake pedals 47. Hence, the vehicle speed can be changed between a speed obtained when the right and left brake pedals 47 are stepped on to the boundary position (g) and the zero speed; and also, the vehicle body can be braked and stopped at the time of or prior to arrival of the right and left bake pedals 47 at the deceleration completion position (c).

And, when the right and left brake pedals 47 move beyond the deceleration completion position (c), the vehicle speed controlling means 27B is switched over from a state for executing the pedal speed change control based on the first data to a state for executing the pedal speed change control based on the second data. Whereby, while the right and left brake pedals 47 move from the stepping limit position (d) beyond the deceleration completion position (c) to arrive at the boundary position (g), the vehicle speed controlling means 27B maintains the output from the HMT 33 at the zero speed and the right and left side brakes 49 brake the rear wheels 5 with a braking force corresponding to the simultaneous stepping operational amount in the braking operational range of the right and left brake pedals 47. As a result, the vehicle body can be maintained under the braked and stopped state even if the stepping force onto the right and left brake pedals 47 is reduced to bring the right and left brake pedals 47 closer to the boundary position (g) than the deceleration completion position (c).

Further, during the movement of the right and left brake pedals 47 from the boundary position (g) back to the acceleration start position (e), the vehicle speed controlling means 27B maintains the output from the HMT 33 to zero speed, thus constantly maintaining the vehicle speed to zero. As a result, the vehicle body can be maintained under the braked and stopped state, even if the stepping force onto the right and left brake pedals 47 is reduced to bring the right and left brake pedals 47 closer to the acceleration start position (e) than to the boundary position (g) and release the braking of the right and left rear wheels 5 by the right and left side brakes 49.

Furthermore, during the movement of the right and left brake pedals 47 from the acceleration start position (e) back to the acceleration completion position (f), the vehicle speed controlling means 27B changes the output from the HMT 33 according to the simultaneous stepping operational position of the right and left brake pedals 47 and the right and left side brakes 49 do not brake the right and left rear wheels 5. Hence, the vehicle speed can be changed between the zero speed and a set speed with a simultaneous stepping operation of the right and left brake pedals 47.

And, when the right and left brake pedals 47 move past the acceleration completion position (f), the vehicle speed controlling means 27B is switched over from the state for executing the pedal speed change control based on the second data to the state for executing the pedal speed change control based on the first data. And, as described hereinbefore, during the movement of the right and left brake pedals 47 from the stepping release position (a) to the deceleration start position (b), the vehicle speed can be maintained fixed at the set speed, despite a simultaneous stepping operation of the right and left brake pedals 47.

That is, the right and left brake pedals 47 can be used as speed change operational pedals for changing the vehicle speed between the zero speed and a set speed. With this, speed change operations can be made simple.

Further, under the condition where the vehicle body is braked and stopped as a result of a simultaneous stepping operation of the right and left brake pedals 47 to an operational position on the stepping limit position side beyond the deceleration completion position (c), the vehicle body will not be started unless the right and left brake pedals 47 are moved beyond the deceleration completion position (c) back to the acceleration start position (e). Therefore, it is possible to prevent inadvertent start of the vehicle body even when the right and left brake pedals 47 are returned to a position between the deceleration completion position (c) and the acceleration start position (e) due to reduction in the stepping force to the right and left brake pedals 47 as a result of e.g. execution of another operation while the vehicle body is braked and stopped with the simultaneous stepping operation of the right and left brake pedals 47.

Moreover, during the execution of the pedal speed change control based on the first data by the vehicle speed controlling means 27B, there occurs no switchover to the pedal speed change control based on the second data unless the right and left brake pedals 47 move beyond the deceleration completion position (c). Therefore, during a simultaneous stepping operation of the right and left brake pedals 47 between the deceleration start position (b) and the deceleration completion position (c), there is provided a same operational feel without a change in the relationship between the simultaneous stepping operational positions of the right and left brake pedals 47 and the vehicle speeds. Also, during execution of the pedal speed change control based on the second data by the vehicle speed controlling means 27B, no switchover to the pedal speed change control based on the first data occurs, unless the right and left brake pedals 47 move beyond the acceleration completion position (f). Therefore, during the simultaneous stepping operation of the right and left brake pedals 47 between the deceleration start position (b) and the deceleration completion position (c), no change occurs in the relationship between the simultaneous stepping operational positions of the right and left brake pedals 47 and the vehicle speeds. Hence, the operational feel is kept same. Consequently, this will facilitate e.g. an inching operation for effecting start and stop of the vehicle body in repetition.

As shown in FIG. 4, FIG. 7 and FIG. 8, during a high speed traveling, when the operational state of the forward-reverse switching device 12 acting as transmission switching means E is switched based on an output from the FR sensor 44 acting as commanding means F for commanding forward-reverse switchover by the forward-reverse switching device 12, this results in increase in the amount of energy absorbed by the forward clutch 12A and the reverse clutch 12B, so that there is the risk of burnout damage to the forward clutch 12A and the reverse clutch 12B. For this reason, the forward-reverse switchover controlling means 27C is configured to effect a controlling operation as follows for avoiding occurrence of such burnout.

First, the process determines whether or not a switchover operation of the FR lever 44 to the forward traveling position or the reverse traveling operation has been detected based on the output from the FR sensor 44 (step #1). If no switchover operation is detected, the process returns to step #1. Whereas, if a switchover operation is detected, based on the output from the engine sensor 32 and the output from the swash plate angle sensor 40, the process calculates the output speed of the HMT 33 (the input speed for the forward-reverse switching device 12) (step #2) and then determines whether or not the output speed of the HMT 33 exceeds a set speed (e.g. 15 Km/h) for the forward-reverse switchover which is preset for burnout damage prevention (step #3).

If the set speed for burnout damage prevention is not exceeded, the forward clutch 12A or the reverse clutch 12B whichever does not correspond to the operational position of the FR lever 43 is depressurized to be switched to the blocking state. Then, upon lapse of a set period thereafter, the forward clutch 12A or the reverse clutch 12B whichever corresponds to the operational position of the FR lever 43 is pressurized to be switched to the transmission state. In this way, clutch pressure switching control for controlling operations of the forward-reverse switch valve 42 is effected (step #4). Upon completion of the clutch pressure switchover control, the forward-reverse switchover control is ended.

In case the set speed for burnout damage prevention is exceeded, a deceleration control is initiated so that the output speed of the HMT 33 may be reduced with reduction in the swash plate angle of the variable displacement pump 34A with an operation of the speed change cylinder 36 (step #5). Also, the process calculates the output speed of the HMT 33 based on the output from the engine sensor 32 and the output from the swash plate angle sensor 40 (step #6) and measures the period from the initiation of the deceleration control by means of a timer (not shown) included in the ECU 27.

Next, the process determines whether the output speed of the HMT 33 has reached the set speed for burnout damage prevention or not (step #8). If the set speed for burnout damage prevention has been reached, the deceleration control is terminated and the output speed of the HMT 33 is maintained to the set speed for burnout damage prevention (step #9). Also, the clutch pressure switching control is initiated (step #10) and the process measures the period from the initiation of the clutch pressure switching control with the timer (step #11).

On the other hand, if the set speed for burnout damage prevention has not yet been reached at step #8, the process determines whether the measured period from the initiation of the deceleration control has passed a first set period or not (step #12). If the period has not yet been passed, the process returns to step #8. Whereas, if the period has been passed, the process goes to step #9 to maintain the output speed of the HMT 33 to the current speed thereof.

After initiation of the clutch pressure switching control, the process determines whether the clutch pressure of the pressurizing side forward clutch 12A or reverse clutch 12b has reached a set pressure or not (step #13). If the pressurizing side clutch pressure has reached the set pressure, an acceleration control is effected for controlling the operation of the speed change valve 37 such that the output speed of the HMT 33 may increase to the set speed corresponding to the operational position of the main speed change valve lever 38 with increase of the swash plate angle of the variable displacement pump 34A (step #14).

On the other hand, if the pressurizing side clutch pressure has not yet reached the set pressure, the process determines whether the measured period from the initiation of the pressure switching control has passed a second period or not (step #15). If the period has not yet been passed, the process returns to step #13. Whereas, if the period has been passed, the process goes to step #14 to effect the acceleration control.

Then, the process determines whether the clutch pressure switching control has been completed or not (step #16). Upon completions of the clutch pressure switching control and the acceleration control, the forward-reverse switchover control is terminated.

That is, in case the output speed of the HMT 33 during the forward and reverse switchover operation based on the operation of the FR lever 43 is a speed which can be reduced to the set speed for burnout damage prevention within the first set period with the deceleration control, burnout damage to the forward clutch 12A and the reverse clutch 12B can be avoided without giving any unnatural feel to the driver with prolongation of the forward-reverse switching period. Further, even if the output speed of the HMT 33 is not a speed which can be reduced to the set speed for burnout damage prevention within the first period, burnout damage to the forward clutch 12A and the reverse clutch 12B can be avoided also without giving any unnatural feel to the driver with prolongation of the forward-reverse switching period.

Incidentally, with this tractor, the engine sensor 32, the swash plate angle sensor 40 and so on together constitute detecting means G for detecting the output speed of the HMT 33 as the rotational speed of the power transmission line including the forward-reverse switching device 12. Further, the HMT 33 functions as speed changing means H for changing the rotational speed of the power transmission line including the forward-reverse switching device 12 at the time of forward-reverse switchover by an operation of this forward-reverse switching device 12.

FURTHER EMBODIMENTS

[1] As the stepless speed change device A, a hydrostatic stepless speed change device or a belt type stepless speed change device, etc. can be employed.

[2] As the speed change operating means B, an electrically driven cylinder etc. can be employed.

[3] As the operational pedal C, this can be a single brake pedal. And, the brake device D can be a single brake device. Further, this can be configured for braking the front wheels 4 or the rear wheels 5 or braking both the front wheels 4 and the rear wheels 5.

[4] The pedal sensor 51 can be provided in correspondence with each one of the right and left brake pedals 47.

[5] As the speed change operational tool 38, a switch or the like can also be employed.

[6] The first data and the second data can be set such that their acceleration completion positions (b), (f) are same.

[7] The operational range of the operational pedal C from the deceleration completion position (e) to the stepping limit position (d) of the second data can be set to the braking operational range for operating the brake device D.

[8] The transmission switching means E can be not only a hydraulic clutch type speed change device having a plurality of hydraulic clutches 12A, 12B for effecting a multiple stages of speed change operations, but also a front wheel speed change device including a plurality of hydraulic clutches 12A, 12B for changing the drive speed of the front wheels 4 in multiple stages, etc. The number of the hydraulic clutches 12A, 12B can be three or more.

[9] The commanding means F can be a two-position switchover switch, an ON/OFF switch or the like.

[10] The detecting means G can be an engine sensor 32, an electromagnetic pickup type rotational sensor for detecting an output from the stepless speed change device A or can be an electromagnetic pickup type rotary sensor for detecting a vehicle speed.

[11] The speed changing means H can be the engine 1 and the brake device D. Further, it can be effected by combinational operations of the stepless speed change device A, the engine 1, the brake device D, etc. Further, it is possible to configure such that in case it is not possible to reduce the rotational speed in the power transmission line to the set speed for burnout damage prevention within the first set period with an operation of a single device alone such as the stepless speed change device A, the engine 1, or the brake device D, etc., the reduction is effected by combination of the stepless speed change device A, the engine 1, or the brake device D, etc.

[12] The controlling means 27 may be configured such that switchover of the transmission state is effected by controlling the pressures of the plurality of hydraulic clutches 12A, 12B only when the rotational speed in the power transmission line is reduced to the set speed by a deceleration operation of the speed changing means H.

[13] The controlling means 27 may be configured such that switchover of the transmission state is effected by controlling the pressures of the plurality of hydraulic clutches 12A, 12B only when the rotational speed in the power transmission line is reduced by a deceleration operation of the speed changing means H effected for a set period.

[14] A tractor is illustrated as one example of a work vehicle in the foregoing embodiment, but this is not limitative. The work vehicle includes also a riding type paddy field transplanter, a combine-harvester, a riding type mower and the like.

What is claimed is:

1. A vehicle speed control arrangement for a work vehicle, comprising:
    speed change operating means for speed-changing a stepless speed change device to change an output from the stepless speed change device;
    a brake device for braking a wheel with a braking force according to an operational position of an operational pedal which is automatically returned to a stepping release position;
    a pedal sensor for detecting the operational position of the operational pedal; and
    controlling means for controlling an operation of the speed change operating means based on the output from the pedal sensor, thereby to change the output from the stepless speed change device to a speed according to the output from the pedal sensor in a speed change range between a set speed preset by a speed change operational tool and a zero speed;
    wherein said controlling means includes, as speed change output setting data indicative of relationship between operational positions of the operational pedal and outputs from the stepless speed change device, first data for setting a deceleration completion position of the operational pedal where the output from the stepless speed change device is zero to provide a larger operational amount of the operational pedal from said stepping release position, and second data for setting said deceleration completion position to provide a smaller operational amount of the operational pedal from said stepping release position; and
    wherein upon detection, from the output from said pedal sensor during execution of a controlling operation based on said first data, that the operational position of the operational pedal is at a position on the side of a stepping limit position beyond said deceleration completion position, said controlling means is switched over from a state for executing the controlling operation based on said first data to a state for executing the controlling operation based on said second data.

2. The vehicle speed control arrangement for a work vehicle according to claim 1, wherein acceleration completion positions of the operational pedal for changing the outputs from the stepless speed change device based on the first data and the second data to said set speed are set such that the acceleration completion position of the second data provides a smaller stepping operational amount from said stepping release position than the acceleration completion position of the first data.

3. The vehicle speed control arrangement for a work vehicle according to claim 1, wherein an operational range of the operational pedal, ranging from an operational position of the operational pedal located between said deceleration completion position of the first data and said deceleration completion position of the second data, to said stepping limit position, is set to a braking operational rage for operating said brake device.

4. The vehicle speed control arrangement for a work vehicle according to claim 2, wherein an operational range of the operational pedal, ranging from an operational position of the operational pedal located between said deceleration completion position of the first data and said deceleration completion position of the second data, to said stepping limit position, is set to a braking operational rage for operating said brake device.

\* \* \* \* \*